(12) United States Patent
Pasko

(10) Patent No.: US 7,730,536 B2
(45) Date of Patent: Jun. 1, 2010

(54) SECURITY PERIMETERS

(75) Inventor: Douglas Pasko, Herndon, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1168 days.

(21) Appl. No.: 11/147,303

(22) Filed: Jun. 8, 2005

(65) Prior Publication Data

US 2006/0282891 A1    Dec. 14, 2006

(51) Int. Cl.
*G06F 21/20* (2006.01)

(52) U.S. Cl. .............................. 726/23; 726/12; 726/13; 726/14; 726/15

(58) Field of Classification Search ............. 726/11–15, 726/22–25; 709/223–226; 713/188, 194
See application file for complete search history.

(56) References Cited

U.S. PATENT DOCUMENTS

| | | | |
|---|---|---|---|
| 2002/0083175 A1 | 6/2002 | Afek et al. | |
| 2004/0010601 A1* | 1/2004 | Afergan et al. | .............. 709/229 |
| 2004/0010718 A1 | 1/2004 | Porras et al. | |
| 2004/0019781 A1 | 1/2004 | Chari et al. | |
| 2004/0148520 A1* | 7/2004 | Talpade et al. | .............. 713/201 |
| 2006/0236394 A1* | 10/2006 | Morrow et al. | ................. 726/23 |

OTHER PUBLICATIONS

Chang, R. "Defending Against Flooding-Based Distributed Denial-of-Service Attacks: A Tutorial", IEEE Communications Magazine, Oct. 2002.
Blue Coat Systems; "Visibility and Control of Web Communications"; Jun. 1, 2005 (print date); 2 pages.
Akamai Technologies, Inc.; "On Demand DoS Mitigation"; Jun. 1, 2005 (print date); 2 pages.
Cisco Systems Inc.; "Cisco Anomaly Guard Module"; Feb. 4, 2005; pp. 1-11.
Scott Hermann et al.; "Content Delivery Networks"; Oct. 18, 2002; 18 pages.
Art Stricek; "A Reverse Proxy is a Proxy by Any Other Name"; Jan. 10, 2002; 15 pages.

\* cited by examiner

*Primary Examiner*—Taghi T Arani
*Assistant Examiner*—Justin T Darrow

(57) ABSTRACT

A security system that is associated with a customer network includes first, second, and third security perimeters. The first security perimeter includes a set of content delivery network (CDN) devices configured to provide first protection against a network attack associated with the customer network. The second security perimeter includes a set of mitigation devices configured to provide second protection in terms of mitigation services as a result of a network attack associated with the customer network. The third security perimeter includes a set of hierarchy devices configured to provide third protection against a network attack associated with the customer network.

28 Claims, 12 Drawing Sheets

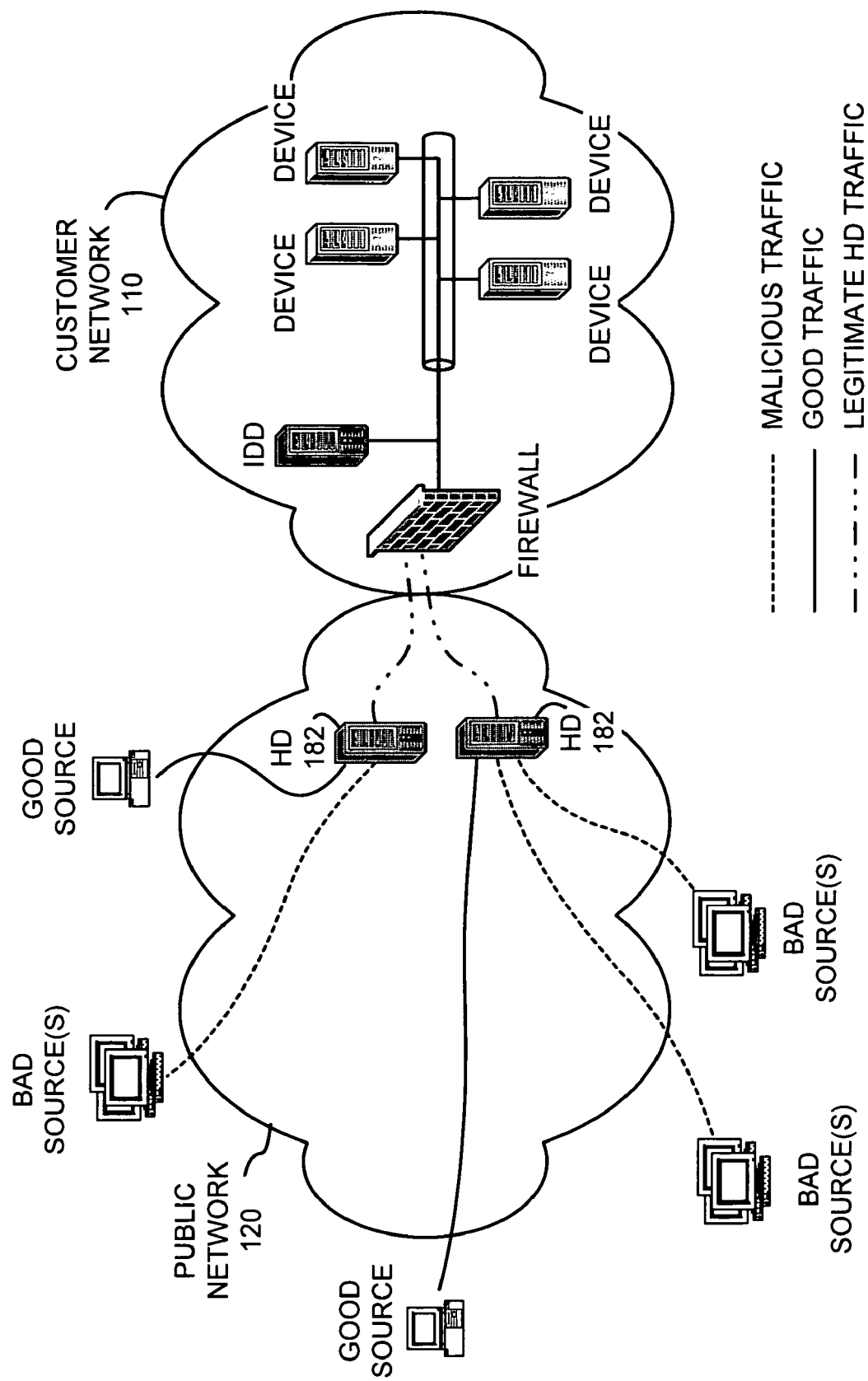

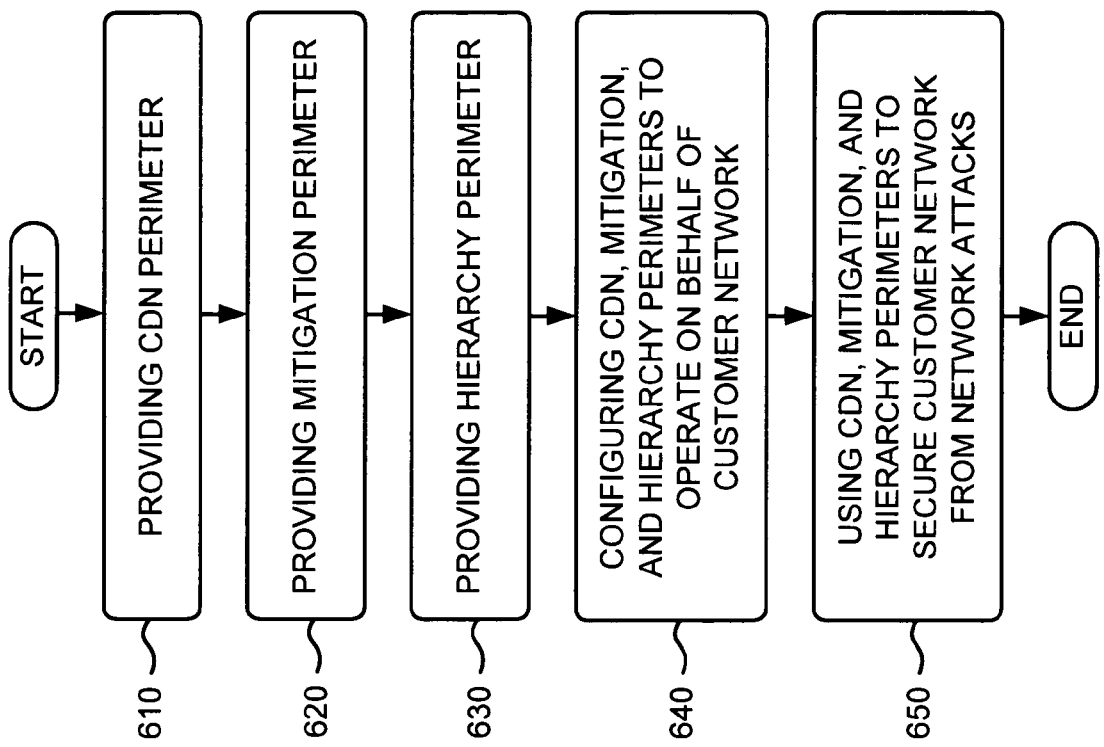

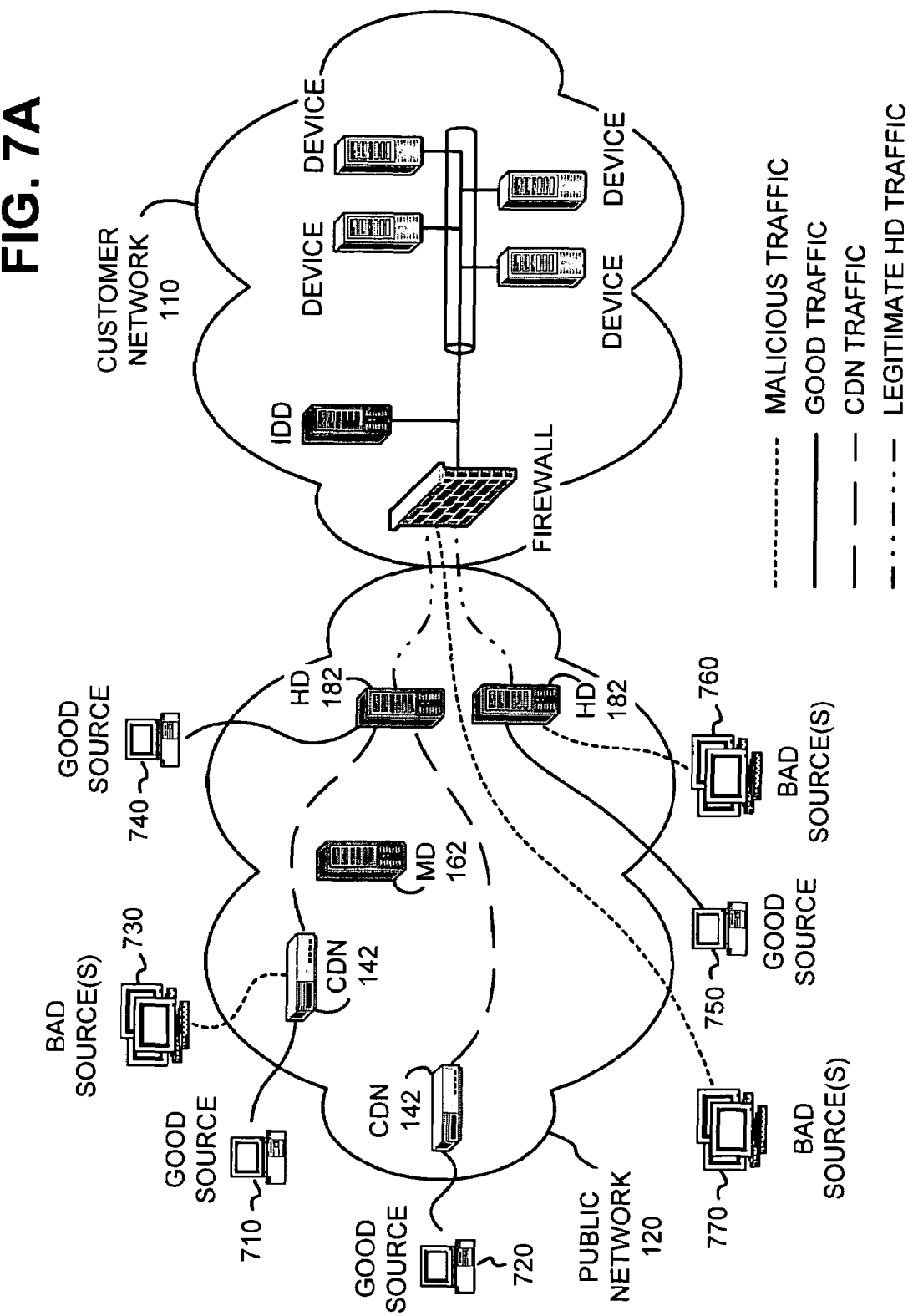

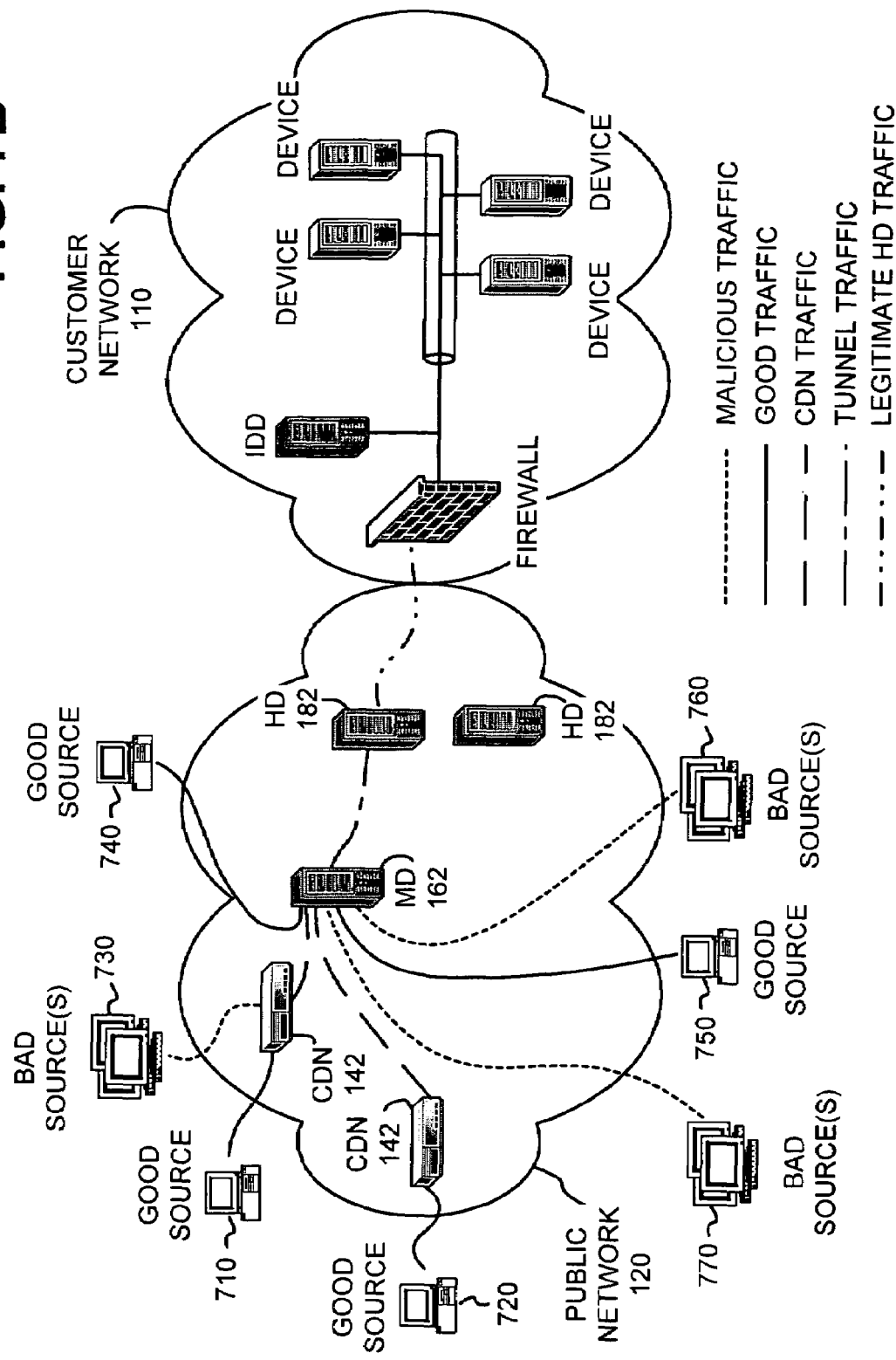

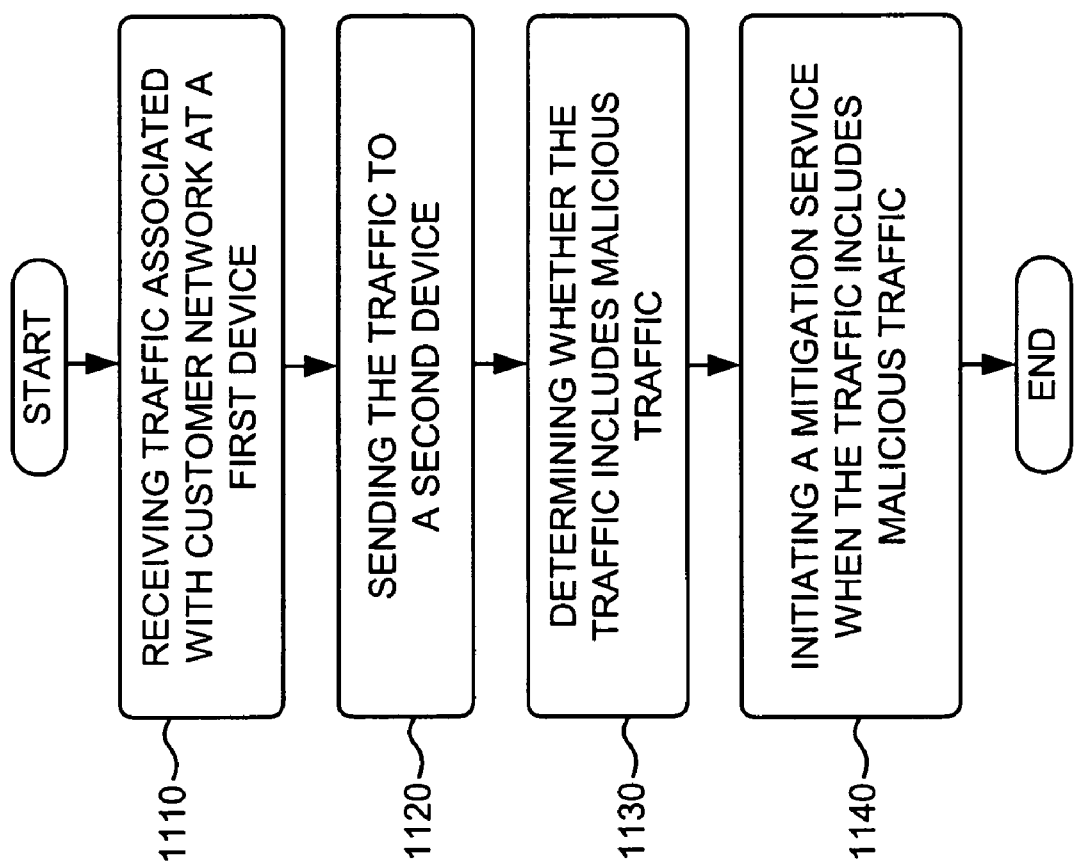

SECURITY PERIMETERS

BACKGROUND

1. Field of the Invention

Implementations described herein relate generally to network security and, more particularly, to security perimeters that may be used to protect a customer network from network attacks.

2. Description of Related Art

Network attacks are a real, growing threat to businesses worldwide. These attacks can quickly incapacitate a targeted business, costing victims thousands, if not millions, of dollars in lost revenue and productivity.

One type of network attack, called a denial of service attack, can paralyze Internet systems by overwhelming servers, network links, and network devices (e.g., routers, firewalls, etc.) with bogus traffic. Easily launched against limited defenses, network attacks not only target individual web sites or other servers at the edge of the network, but they also can incapacitate the network itself.

The growing dependence on the Internet makes the impact of successful network attacks increasingly painful (financially and otherwise) for service providers, enterprises, and government agencies. Newer, more powerful tools used by network attackers promise to unleash even more destructive attacks in the months and years to come.

Because denial of service attacks are among the most difficult to defend against, responding to them appropriately and effectively poses a tremendous challenge for all Internet-dependent organizations. Network devices and current perimeter security technologies, such as firewalls and intrusion detection devices (IDDs), although important components of an overall security strategy, do not by themselves provide comprehensive network attack protection.

Current techniques fall short in terms of prevention and/or mitigation of network attacks. Some of the more popular network attack responses, such as blackholing and router filtering, are not optimized to deal with increasingly sophisticated attacks. IDDs offer some excellent attack detection capabilities, but cannot mitigate the impact of the attacks. Firewalls offer a rudimentary level of protection but, like blackholing and router filtering, they were not designed to protect against the types of advanced attacks that are so common today. Still other strategies, such as overprovisioning, do not provide adequate protection against ever larger attacks, and can be costly as a network attack prevention strategy.

Network attacks also make it difficult to keep up with the constant system patching and upgrading required for a successful security system. Many times, implementing significant patches or upgrades is a disruptive event within a customer's network. While overall service disruption can be avoided in a multiple server environment, it still takes time to determine the impact of the patch on the customer's applications and then perform the upgrades.

SUMMARY

According to one aspect, a security system that is associated with a customer network may include first, second, and third security perimeters. The first security perimeter may include a set of content delivery network (CDN) devices configured to provide first protection against a network attack associated with the customer network. The second security perimeter may include a set of mitigation devices configured to provide second protection in terms of mitigation services as a result of a network attack associated with the customer network. The third security perimeter may include a set of hierarchy devices configured to provide third protection against a network attack associated with the customer network.

According to another aspect, a security system that is associated with a customer network may include first and second security perimeters. The first security perimeter may include a set of CDN devices geographically distributed in a public network. The CDN devices may be configured to serve as a first termination point for traffic intended for the customer network. The second security perimeter may include a set of hierarchy devices located within the public network. The hierarchy devices may be configured to serve as a second termination point for traffic intended for the customer network including traffic from the CDN devices.

According to yet another aspect, a security system that is associated with a customer network may include first and second security perimeters. The first security perimeter may include a set of hierarchy devices located outside of the customer network and configured to act as a reverse proxy for the customer network and determine when the customer network is the subject of a network attack. The second security perimeter may include a set of mitigation devices located outside of the customer network and configured to receive traffic intended for the customer network when one of the hierarchy devices determines that the customer network is the subject of the network attack, process the received traffic to remove malicious traffic and leave legitimate traffic, and forward the legitimate traffic to one or more of the hierarchy devices.

According to a further aspect, a method for protecting a customer network is provided. The method may include receiving traffic associated with the customer network at a first device outside the customer network; sending the traffic to a second device outside the customer network; determining, at the second device, whether the traffic includes malicious traffic; and initiating a mitigation service when the traffic is determined to include malicious traffic.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 5 is a diagram illustrating exemplary operation of the hierarchy devices of FIG. 2;

FIG. 6 is a flowchart of exemplary processing for providing security against network attacks according to an implementation consistent with the principles of the invention;

FIGS. 7A and 7B are diagrams illustrating exemplary operation of the CDN, mitigation, and hierarchy devices according to an implementation consistent with the principles of the invention;

FIG. 11 is a flowchart of an exemplary implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Overview

Network attacks, such as distributed denial of service (DDoS) attacks, work by taking advantage of Internet protocols and the fundamental benefit of the Internet of delivering datagrams from nearly any source to any destination, without prejudice. Essentially, it is the behavior of these datagrams that defines the network attack: either there are too many, overwhelming network devices as well as servers, or they are deliberately incomplete to rapidly consume server resources. What makes network attacks so difficult to prevent is that illegitimate datagrams are indistinguishable from legitimate datagrams, making detection difficult. Many of these attacks also use spoofed source IP addresses, thereby eluding source identification by anomaly-based monitoring tools looking for unusually high volumes of traffic coming from specific origins.

A growing trend among network attackers is to use sophisticated spoofing techniques and essential protocols (instead of nonessential protocols that can be blocked) to make network attacks even more stealthy and disruptive. These attacks, which use legitimate application protocols and services, are very difficult to identify and defeat. Employing datagram-filtering or rate-limiting measures simply completes the attacker's task by shutting everything down, causing denial of legitimate traffic.

Figure 1:
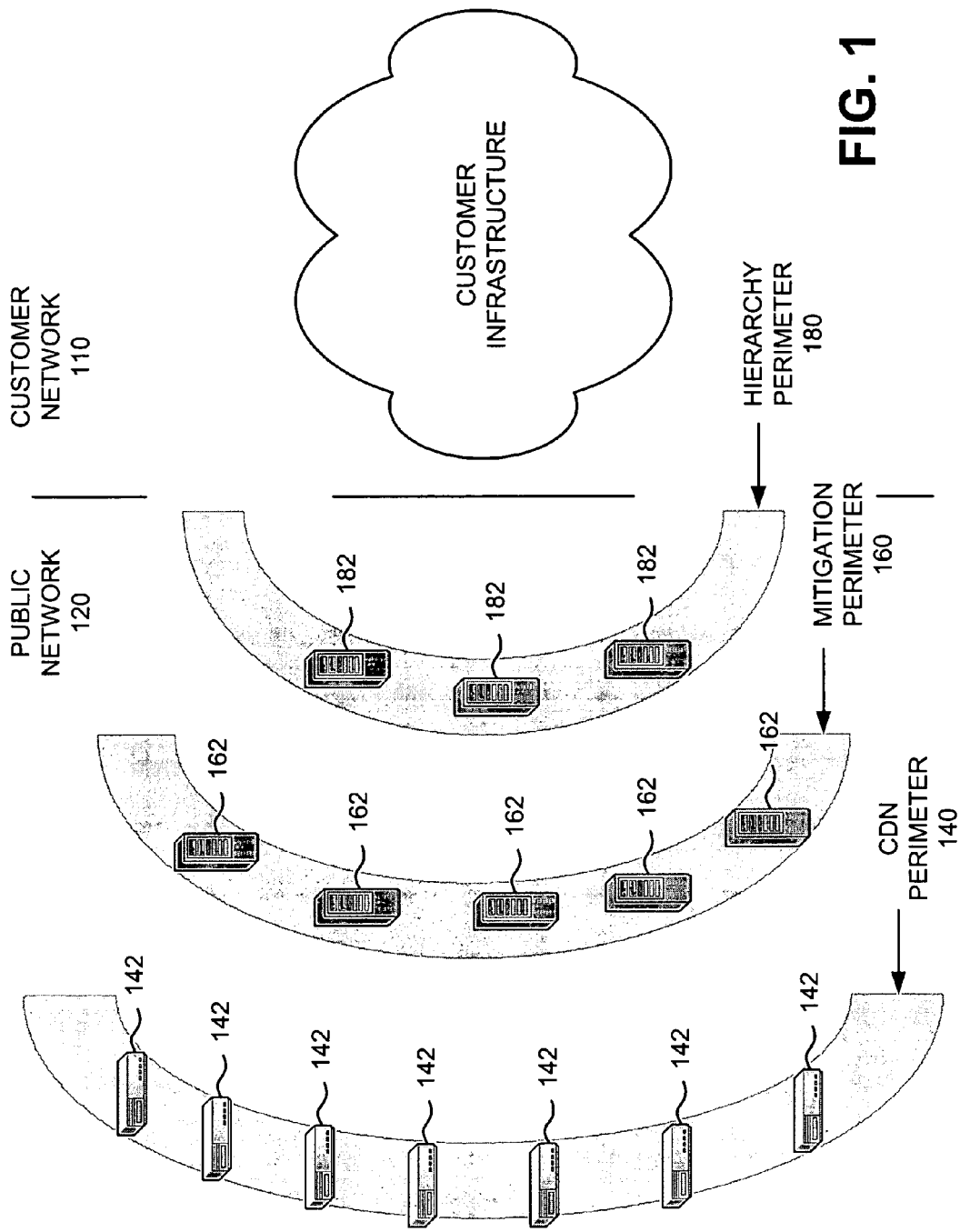
FIG. 1 is a diagram illustrating exemplary concepts consistent with the principles of the invention for preventing and mitigating a network attack.

FIG. 1 is a diagram illustrating exemplary concepts consistent with the principles of the invention for preventing and mitigating a network attack. FIG. 1 shows a customer network 110 and three security perimeters (e.g., CDN perimeter 140, mitigation perimeter 160, and hierarchy perimeter 180). The three security perimeters are shown located on the public side of the connection of customer network 110 to a public network 120, such as the Internet.

Customer network 110 may include hardware and software systems associated with a customer's infrastructure. Customer network 110 may include security systems to protect the customer's infrastructure from network attacks. In one implementation, customer network 110 may provide a service by which it makes content available on public network 120.

CDN perimeter 140 may include a group of CDN devices 142 to provide a first level of protection against network attacks. The particular number of CDN devices 142 used in CDN perimeter 140 may be a design decision. A CDN has traditionally been used to deliver web content to a user based on the geographic locations of the user, the origin of the web content, and its CDN devices. The CDN copies the content of a web server, for example, to a network of CDN devices that are dispersed at geographically different locations. When a user requests content that is part of a CDN, the CDN will direct the request to a CDN device that is closest to the user to deliver the content to the user. In one implementation, CDN perimeter 140 may provide a range of security services on CDN devices 142 for the specific applications that can be served by a CDN device 142. For these applications, CDN device 142 can offer protection against network attacks, core site obscurement, application level filtering, and protection from disruptive operating system and application patching and upgrading.

Mitigation perimeter 160 may include a group of mitigation devices 162 to provide mitigation services, as a second level of protection, in the event of a network attack. The particular number of mitigation devices 162 used in mitigation perimeter 160 may be a design decision. When customer network 110 discovers that it is under attack, traffic intended for customer network 110 can be diverted to a mitigation device, such as one of mitigation devices 162. Mitigation device 162 may process the traffic to remove all malicious traffic while allowing good traffic to continue flowing uninterrupted. After the traffic has been processed to remove malicious traffic, mitigation device 162 may forward the good traffic to customer network 110 or hierarchy perimeter 180.

Hierarchy perimeter 180 may include a group of hierarchy devices 182 to provide a third level of protection against network attacks. The particular number of hierarchy devices 182 used in hierarchy perimeter 180 may be a design decision. Hierarchy devices 182 may interface with customer network 110 and act as reverse proxies. A reverse proxy acts as a gateway to a customer's network by acting as the final IP address for requests from outside the customer's network. From outside the customer's network, the reverse proxy appears as a system within the customer's network. Similarly, hierarchy devices 182 may act as final IP addresses for systems of customer network 110.

CDN perimeter 140, mitigation perimeter 160, and hierarchy perimeter 180 may expand the security system for customer network 110 well beyond the connection point of customer network 110 to public network 120. Combining these perimeters into the security system of customer network 110 permits customer network 110 to withstand nearly any scale network attack, transparently increase its serving capacity, make its network invisible to public network 120, and patch and upgrade its systems on its own schedule and not the schedule of the latest vulnerability.

Exemplary Network Configuration

Figure 2:
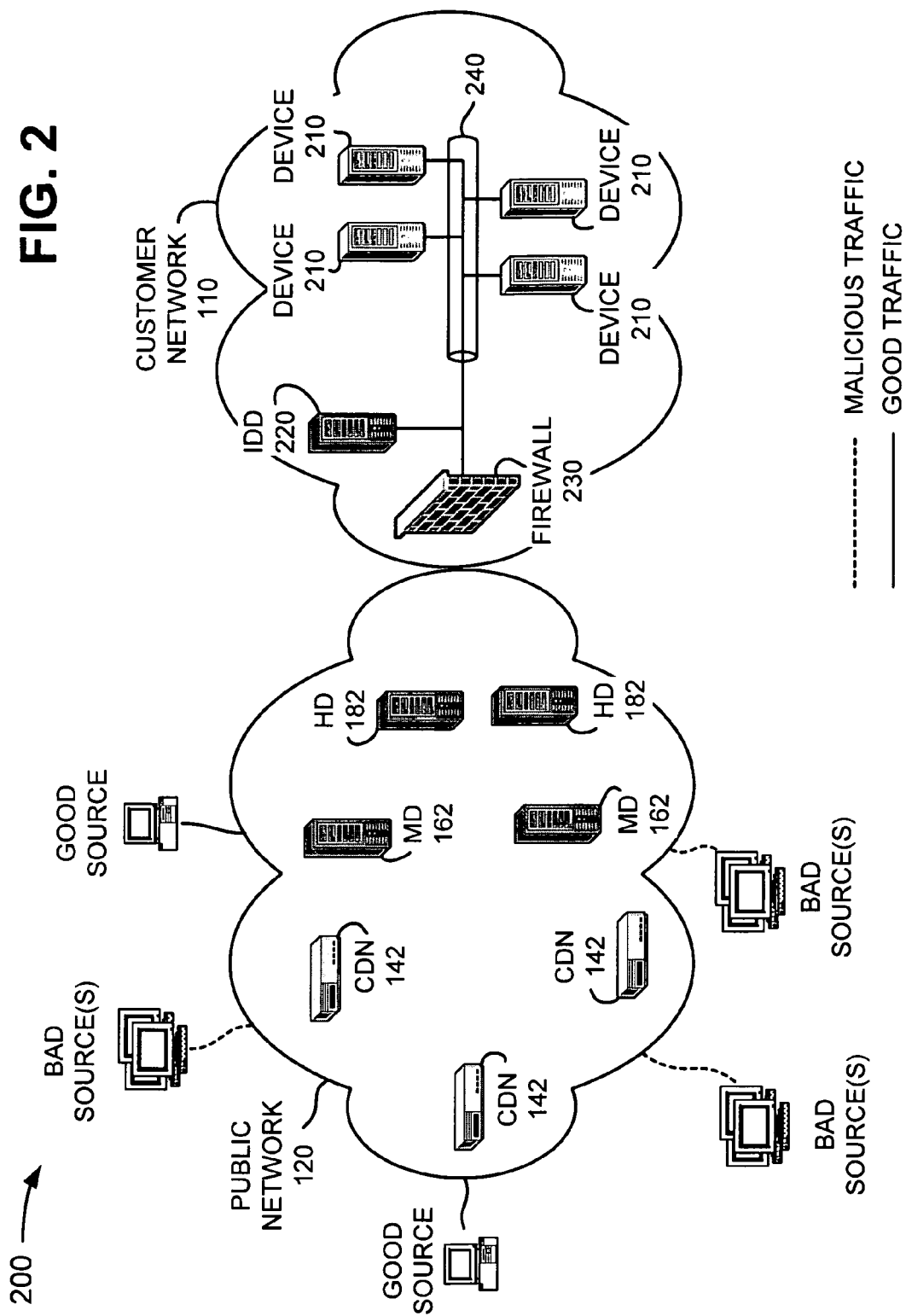
FIG. 2 is a diagram of an exemplary network in which systems and methods consistent with the principles of the invention may be implemented.

FIG. 2 is a diagram of an exemplary network 200 in which systems and methods consistent with the principles of the invention may be implemented. Network 200 may include customer network 110 connected to public network 120. The particular systems making up customer network 110 may vary. As shown in FIG. 2, for example, customer network 110 may include a group of customer devices 210 connected to an IDD 220 and a firewall 230 via a network 240. In other implementations, customer network 110 may include more, fewer, or different systems. Also, in some instances, two or more of the systems may be implemented as a single device and/or one of the systems may be implemented as two or more (possibly distributed) devices.

Customer devices 210 may include personal computers, workstations, personal digital assistants (PDAs), lap tops, wireless or landline telephone systems, and/or other types of computation or communication devices. In one implementation, one or more of customer devices 210 may operate as server devices that store and/or manage information and make at least some of this information available to one or more client devices outside of customer network 110.

IDD 220 may include a security device that inspects inbound (and possibly outbound) network activity and identifies suspicious patterns that may indicate an attack on customer network 110. IDD 220 may provide misuse detection by which IDD 220 analyzes the information it gathers and compares it to a large database of attack signatures. Alternatively, or additionally, IDD 220 may provide anomaly detection by which IDD 220 monitors network segments to compare their state to a normal baseline of network traffic load, breakdown, protocol, and typical packet size and identifies any anomalies. IDD 220 may operate in passive and/or reactive modes. In the passive mode, IDD 220 may detect a potential security breach, log the information, and signal an alert. In the reactive mode, IDD 220 may respond to suspicious activity by logging off a user or by reprogramming firewall 230 to block network traffic from the suspected malicious source.

Firewall 230 may include hardware and/or software that prevents unauthorized access to or from customer network 110. Firewall 230 may examine each message entering or leaving customer network 110 and block those that do not meet specified security criteria.

Network 240 may include a local area network (LAN), a wide area network (WAN), a private network, an intranet, or a combination of networks. Customer devices 210, IDD 220, and firewall 230 may connect to network 240 via wired, wireless, and/or optical connections.

Public network 120 may include a WAN, a telephone network, such as the Public Switched Telephone Network (PSTN), an intranet, the Internet, or a combination of networks. Various good and bad sources of traffic may connect to public network 120 via wired, wireless, and/or optical connections. An example of a good source of traffic may include a legitimate web surfer. An example of a bad source of traffic may include a source of a DDoS attack.

As described with regard to FIG. 1, public network 120 may include three security perimeters. For example, public network 120 may include a group of CDN devices 142 (associated with the CDN perimeter), a group of mitigation devices (MD) 162 (associated with the mitigation perimeter), and a group of hierarchy devices (HD) 182 (associated with the hierarchy perimeter). Each of these devices 142, 162, and 182 may operate alone and in combination to provide additional levels of security for customer network 110. Accordingly, each of devices 142, 162, and 182 will be described in terms of the security features they offer alone and then how they work together to provide superior security for customer network 110.

Security Provided By CDN Perimeter

The CDN perimeter may make up the outermost layer of a security system according to an implementation consistent with the principles of the invention. The CDN perimeter makes it possible to obscure the presence of customer network 110 from the standpoint of public network 120, while increasing the scalability and reliability of customer network 110.

During the evolution of CDNs, the nature of the service paved the way for a number of security functions. Traditionally thought of as simply "technology making web-serving faster," the CDN enables a range of security services for the specific applications that can be served by the CDN. These applications might include, for example, HTTP-based applications, HTTPS-based applications, FTP services, and streaming media services.

Figure 3:
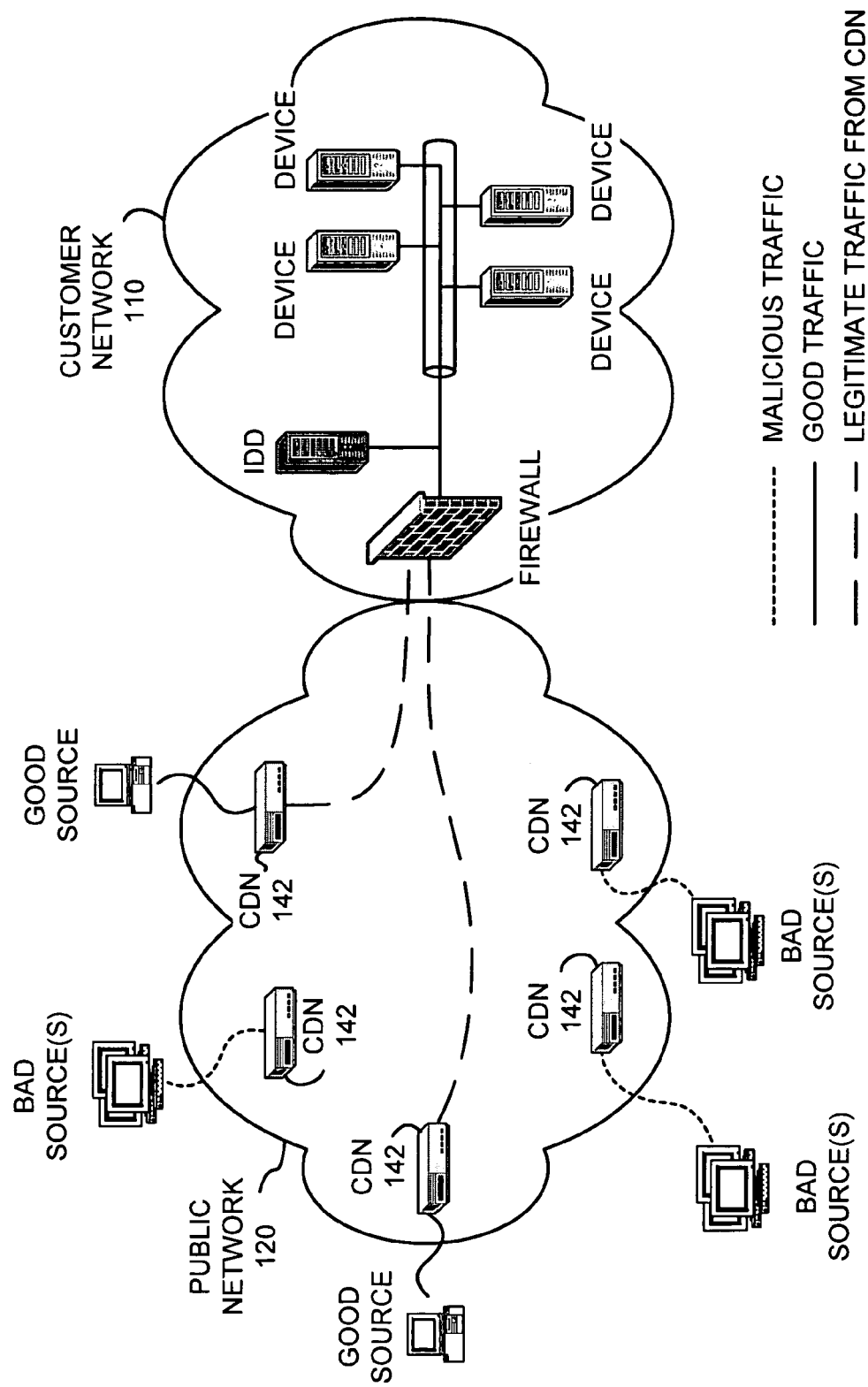
FIG. 3 is a diagram illustrating exemplary operation of the CDN devices of FIG. 2.

FIG. 3 is a diagram illustrating exemplary operation of CDN devices 142. CDN devices 142 may include conventional CDN devices that are modified to include security features that may be used on behalf of customer network 110. CDN devices 142 may be dispersed at geographically different locations.

Each CDN device 142 may appear as a discrete service termination point for customer network 110. Therefore, the traffic handled by CDN devices 142 does not reach customer network 110, thereby obscuring the presence of customer network 110. In some situations, a CDN device 142 may contact customer network 110, such as when needing content to satisfy a user's request or when passing on a request that it does not understand.

By design, different end users are provided with different IP addresses (associated with particular ones of CDN devices 142) based on geographic location. To bad sources (i.e., sources of malicious traffic, such as DDoS attack servers), customer network 110 appears to be in various locations. Because malicious traffic from bad sources may originate from different geographic locations, each individual bad source may end up attacking a different CDN device 142. This serves to diffuse the attack. As a result, a single CDN device 142 needs not bear the brunt of the attack. In the event that bad sources are configured to attack one specific CDN device 142 by hard-coded IP, for example, that CDN device 142 may be configured to send legitimate traffic to other CDN devices 142 providing the service.

The protection against attack may extend beyond the initial diffusion of the attack. Each CDN device 142 may be hardened against attack, using any well known network attack detection/prevention techniques to thwart known attacks. Each CDN device 142 may be specialized and tuned for maximum performance and resilience in the face of attack. For example, each CDN device 142 may include a set of application-level rules that it may use to filter traffic for security purposes. The rules may identify the types of traffic and/or applications that are known to be capable of exploiting a vulnerability. When a CDN device 142 receives traffic identified by the rules or associated with an application identified by the rules, it may discard the traffic.

As explained above, CDN devices 142 may act as termination points for certain traffic for customer network 110 and, thereby, obscure the presence of customer network 110.

Using a CDN perimeter to protect the infrastructure of a network creates a number of opportunities for cost savings. One of the impacts of using a CDN perimeter is bandwidth offloading. This is accomplished using standard CDN technologies to serve various types of objects to end users directly. That bandwidth no longer crosses any of the servers or circuits in the infrastructure of customer network 110. This reduction in bandwidth is also accompanied by a reduction in processor use across the public facing infrastructure of customer network 110. Some processor intensive operations, such as encryption of objects for secure traffic, may be performed by CDN devices 142.

A reduction in bandwidth and processor use can be directly translated into a reduction of infrastructure required. Less circuit capacity to public network 120 may be needed, and a multi-server infrastructure can see reclamation of servers, which can be re-tasked for other pending projects. Planned upgrades to expand delivery capacity can be moved out into the future or eliminated entirely. Finally, the CDN security protection extends beyond malicious traffic. An unexpected but legitimate high volume event may have little impact on the infrastructure of customer network 110 since CDN devices 142 will handle the vast majority of the load.

Security Provided By Mitigation Perimeter

Network attackers typically engage a wide variety of sources to target a customer's network. While CDN devices 142 can obscure the presence of customer network 110, an attack can still be launched directly using the IP addresses associated with systems of customer network 110. The mitigation perimeter may offer another level of security in the form of mitigation services.

Figure 4:
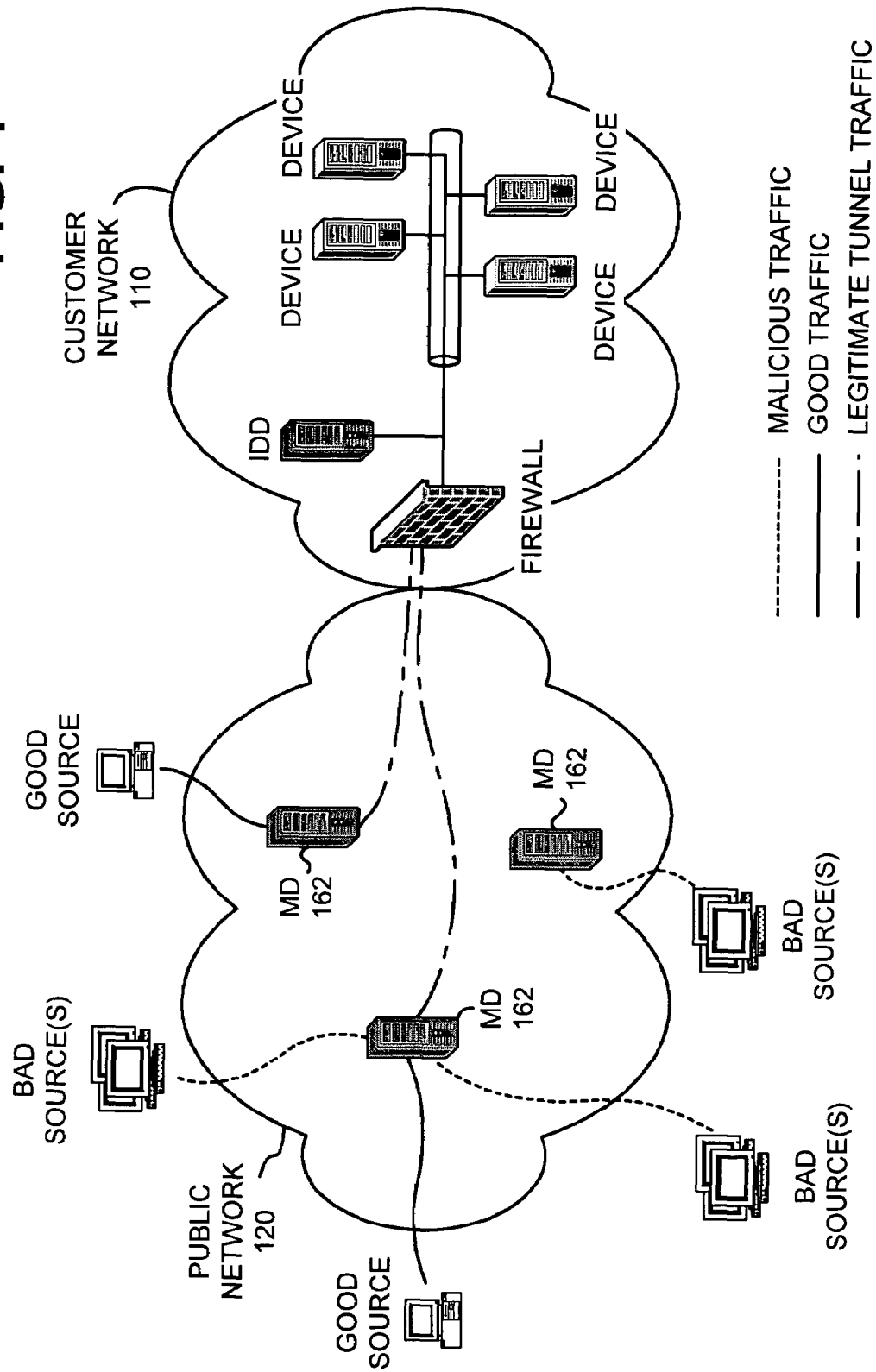
FIG. 4 is a diagram illustrating exemplary operation of the mitigation devices of FIG. 2.

FIG. 4 is a diagram illustrating exemplary operation of mitigation devices 162. Mitigation devices 162 may include devices capable of scrubbing traffic to remove malicious traffic while allowing good traffic to flow uninterrupted. In one implementation, a mitigation device 162 may subject traffic to a multi-verification process that entails dynamic filtering, activation verification, anomaly recognition, protocol analysis, and rate limiting. In another implementation, a mitigation device 162 may include some other known type of device that is capable of scrubbing traffic to remove malicious traffic.

In one implementation, mitigation devices 162 may be dispersed at geographically different locations. Optionally, sets of mitigation devices 162 may be formed into mitigation centers. Mitigation devices 162 in the different mitigation centers may offer redundancy. Therefore, if a mitigation device 162 within a mitigation center or the mitigation center itself fails, another mitigation device 162 or mitigation center can be used.

When an attack, such as a DDoS attack, is detected at customer network 110, a mitigation service may be initiated. The mitigation service may redirect traffic intended for customer network 110 to one (or more) of mitigation devices 162. Mitigation device(s) 162 may scrub the traffic to remove malicious traffic and leave the good traffic.

Mitigation device(s) 162 may forward the good traffic to customer network 110 using a tunnel, such as a generic routing encapsulation (GRE) tunnel. A GRE tunnel may be used to traverse traffic from one place in a network to another place in the network without requiring a lot of routing decisions to be made in between those two places. To forward the good traffic to customer network 110, mitigation device(s) 162 may apply a tunnel encapsulation to the traffic. For example, mitigation device(s) 162 may add another header to the traffic that includes both the source address (i.e., the address of mitigation device 162) and the destination address (i.e., an address associated with customer network 110). A network device that receives the tunnel traffic may recognize it as tunnel traffic and forward it onto its destination (i.e., customer network 110). When customer network 110 receives the tunnel traffic, it may strip the encapsulation and process or forward the traffic, as necessary.

Security Provided By Hierarchy Perimeter

Network attackers typically engage a wide variety of sources to target a customer's network. While CDN devices 142 can obscure the presence of customer network 110 to certain types of applications, other types of applications may be used to launch an attack directly at customer network 110. The hierarchy perimeter may offer another level of security to further obscure the presence of customer network 110.

FIG. 5 is a diagram illustrating exemplary operation of hierarchy devices 182. Hierarchy devices 182 may include devices capable of acting as reverse proxies on behalf of customer network 110. For example, hierarchy devices 182 may act as a gateway to customer network 110 by acting as the final IP address for traffic destined for customer network 110.

Hierarchy devices 182 may be configured to receive all traffic intended for customer network 110, including traffic from CDN devices 142 (not shown), traffic from applications not handled by CDN devices 142, and traffic from mitigation devices 162 (not shown). Each hierarchy device 182 may be hardened against attack, using any well known network attack detection/prevention techniques to thwart known attacks. For example, each hierarchy device 182 may include a set of application-level rules that it may use to filter traffic for security purposes. The rules may identify the types of traffic and/or applications that are known to be capable of exploiting a vulnerability. When a hierarchy device 182 receives traffic identified by the rules or associated with an application identified by the rules, it may discard the traffic.

By instituting this type of hierarchy, customer network 110 can rigidly wall off its core infrastructure from the outside world. Customer network 110 can, thereby, limit all traffic flows reaching its firewall to the set of hierarchy devices 182. Even if an IP address associated with a system of customer network 110 was somehow discovered by a would-be attacker, hierarchy devices 182 may block the malicious traffic before it reached the outside of the firewall.

Because hierarchy devices 162 act as a gateway for traffic intended for customer network 110, they obscure the presence of customer network 110 from the standpoint of public network 120. As a result, operators of customer network 110 may perform system patching and upgrading (e.g., security patching and upgrading) in a more organized and less disruptive fashion.

Exemplary Processing

FIG. 6 is a flowchart of exemplary processing for providing security against network attacks according to an implementation consistent with the principles of the invention. Processing may include providing a CDN perimeter, a mitigation perimeter, and a hierarchy perimeter for a customer network, such as customer network 110 (blocks 610-630). The CDN perimeter may include a group of CDN devices 142 that are geographically distributed in a public network, such as public network 120. The mitigation perimeter may include a group of mitigation devices 162, possibly formed into mitigation centers and geographically distributed in public network 120. The hierarchy perimeter may include a group of hierarchy devices 182 within public network 120. The particular number of CDN devices 142, mitigation devices 162, and/or hierarchy devices 182 within these perimeters may be determined based upon one or more parameters, such as cost, estimated bandwidth of traffic for customer network 110, etc.

The CDN perimeter, mitigation perimeter, and hierarchy perimeter may be configured to operate on behalf of customer network 110 (block 640). For example, CDN devices 142 may be configured as termination points for certain traffic intended for customer network 110. CDN devices 142 may also be configured to direct its own traffic (e.g., CDN traffic) to hierarchy devices 182. Mitigation devices 162 may be configured to process traffic intended for customer network 110 upon initiation of a mitigation service. A tunnel, such as GRE tunnel, may be established beforehand between mitigation devices 162 and hierarchy devices 182. Mitigation devices 162 may use the tunnel to send legitimate traffic to hierarchy devices 182. Hierarchy devices 182 may be configured as the gateway for all traffic intended for customer network 110. As such, hierarchy devices 182 may be configured as termination points for traffic intended for customer network 110.

The CDN perimeter, mitigation perimeter, and hierarchy perimeter may be used to secure customer network 110 from network attacks (block 650). For example, CDN devices 142 may be configured as a first layer of security against certain network attacks. Mitigation devices 162 may provide mitigation services in the event of a network attack. Hierarchy devices 182 may provide a final layer of security against network attacks prior to reaching customer network 110.

FIGS. 7A and 7B are diagrams illustrating exemplary operation of the CDN, mitigation, and hierarchy devices according to an implementation consistent with the principles of the invention. While FIGS. 7A and 7B show two CDN devices 142, one mitigation device 162, and two hierarchy devices 182, there may be more or fewer of these devices in practice.

As shown in FIG. 7A, there are several ways that a traffic source might interface with customer network 110. For example, good sources 710 and 720 and bad source(s) 730 might communicate with CDN devices 142. Good sources 740 and 750 and bad source(s) 760 might communicate with hierarchy devices 182. It might also be possible (though unlikely) for a source, such as bad source(s) 770, to bypass the security perimeters and communicate directly with customer network 110.

With regard to good sources 710 and 720, CDN devices 142 may receive legitimate (good) traffic from and send traffic to these sources. For example, CDN devices 142 may receive traffic in the form of requests for content. CDN devices 142 may use one or more well known network attack detection/prevention techniques to determine whether the requests are legitimate or malicious. A CDN device 142 may process a legitimate one of these requests by providing the requested content, obtaining the content or related content from customer network 110, directing the request to another CDN device 142, or, when CDN device 142 does not understand or cannot process the request, sending the request to customer network 110 via hierarchy device 182.

With regard to bad source(s) 730, CDN device 142 may receive malicious (bad) traffic from bad source(s) 730. CDN device 142 may use one or more well known network attack detection/prevention techniques, such as application-level filtering, to detect and discard the malicious traffic. For example, CDN device 142 may include a list of known malicious traffic and/or applications. When CDN device 142 receives traffic identified on its list or associated with an application identified on its list, it may discard the traffic.

It may be possible for bad source(s) 730 to provide malicious traffic that is not recognized by CDN device 142. In this case, CDN device 142 may forward the malicious traffic to a hierarchy device 182. Hierarchy device 182 may use one or more well known network attack detection/prevention techniques, such as application-level filtering or filtering of finer granularity, to detect and discard the malicious traffic. For example, hierarchy device 182 may include a list of known malicious traffic and/or applications. When hierarchy device 182 receives traffic identified on its list or associated with an application identified on its list, it may discard the traffic.

With regard to good sources 740 and 750, hierarchy devices 182 may receive legitimate (good) traffic from and send traffic to these sources. Hierarchy devices 182 may use one or more well known network attack detection/prevention techniques, such as application-level filtering or filtering of finer granularity, to determine whether traffic from these sources is legitimate or malicious. Hierarchy devices 182 may forward legitimate traffic onto customer network 110.

With regard to bad source(s) 760, hierarchy device 182 may receive malicious (bad) traffic from bad source(s) 760. Hierarchy device 182 may use one or more well known network attack detection/prevention techniques, such as application-level filtering or filtering of finer granularity, to detect and discard the malicious traffic. For example, hierarchy device 182 may include a list of known malicious traffic and/or applications. When hierarchy device 182 receives traffic identified on its list or associated with an application identified on its list, it may discard the traffic.

With regard to bad source(s) 770, it may be possible (though unlikely) for a network attacker to direct an attack directly on customer network 110. This may occur, for example, when the network attacker somehow discovers an IP address of a system of customer network 110. When this occurs, the firewall of customer network 110 may determine that customer network 110 is the subject of a network attack.

When customer network 110 is the subject of a network attack, the mitigation service may be initiated. There are a few ways that the mitigation service may be initiated. For example, customer network 110 (or a person associated with customer network 110) may initiate the mitigation service by notifying a network device, such as a hierarchy device 182 or a gateway associated with customer device 110, or a security operations center (SOC). Alternatively, the mitigation service may be initiated without input from customer network 110. For example, hierarchy device 182 or a SOC may detect that customer network 110 is the subject of an attack and may initiate the mitigation service on behalf of customer network 110.

In either event, the next-hop route associated with customer network 110 may be set to mitigation device 162. This next-hop route may be advertised on public network 120. For example, the next-hop route for customer network 110 may be sent to other devices in public network 120. These other devices may update their routing tables based on the next-hop route.

As shown in FIG. 7B, customer traffic may then be redirected to mitigation device 162. The customer traffic may include datagrams from one or more of good and/or bad sources 710-770 and/or datagrams from CDN devices 142. When a network device within public network 120 receives a datagram destined for customer network 110, the network device may identify mitigation device 162 as the destination for the datagram. When there are multiple mitigation devices 162, the network device may select the appropriate one of mitigation devices 162 to receive the datagram.

Mitigation device 162 may scrub the traffic to remove malicious traffic and leave the good traffic. In one implementation, mitigation device 162 may subject the traffic to a multi-verification process that entails dynamic filtering, activation verification, anomaly recognition, protocol analysis, and rate limiting. In another implementation, mitigation device 162 may use another technique to remove malicious traffic.

Mitigation device 162 may forward the good traffic to a hierarchy device 182 using a tunnel, such as a GRE. As explained previously, a GRE tunnel may be used to traverse traffic from one place in a network to another place in the network without requiring a lot of routing decisions to be made in between those two places. In this case, a GRE tunnel may be established between mitigation device 162 and hierarchy device 182.

To forward the good traffic to hierarchy device 182, mitigation device 162 may apply a tunnel encapsulation to the traffic. For example, mitigation device 162 may add another header to the traffic that includes both the source address (i.e., the address of mitigation device 162) and the destination address (i.e., the address associated with hierarchy device 182). A network device that receives the tunnel traffic may recognize it as tunnel traffic and forward it onto its destination (i.e., hierarchy device 182). When hierarchy device 182 receives the tunnel traffic, it may strip the encapsulation and process and forward the traffic, as necessary, to customer network 110.

The additional security that the above-described security perimeters provide to customer network 110 permit system patches and upgrades (e.g., security patches and upgrades) to be performed within customer network 110 in a more organized and less disruptive fashion. One of the most difficult aspects of securing a customer's infrastructure is keeping up with the constant system patching and upgrading required. Many times, implementing significant patches is a disruptive event within the customer's infrastructure. While overall service disruption can be avoided in a multiple server environment, it still takes time to determine the impact of the patch on the customer's applications and then perform the upgrades. With the CDN, mitigation, and hierarchy perimeters in place, customer network 110 may patch and upgrade on its own schedule.

According to implementations consistent with the principles of the invention, CDN devices 142 and hierarchy devices 182 may appear as the termination points for customer network 110, and hierarchy devices 182 may be the only devices communicating directly with customer network 110. A particular type of request that might exploit the vulnerability of customer network 110 and breach its systems can be easily blocked at the edge of the CDN or hierarchy perimeters. The hierarchy perimeter ensures that a network attacker cannot bypass the CDN perimeter and issue damaging requests directly to customer network 110. Any type of request known to be capable of exploiting a vulnerability can be listed for CDN devices 142 and/or hierarchy devices 182 to ignore.

Some vulnerability patches can create problems with third party or custom coded applications. With the knowledge that the new security perimeters are blocking malicious application level requests, customer network 110 can perform normal integration and regression testing of a new patch in its staging environment(s). This dramatically reduces the chance that a "quick security patch" does not inadvertently cause significant service failures/crashes. Security patch scheduling can also be aligned with normal development release cycles and not waste cycles testing patches separately.

Combinations Of Security Perimeters

Figure 8:
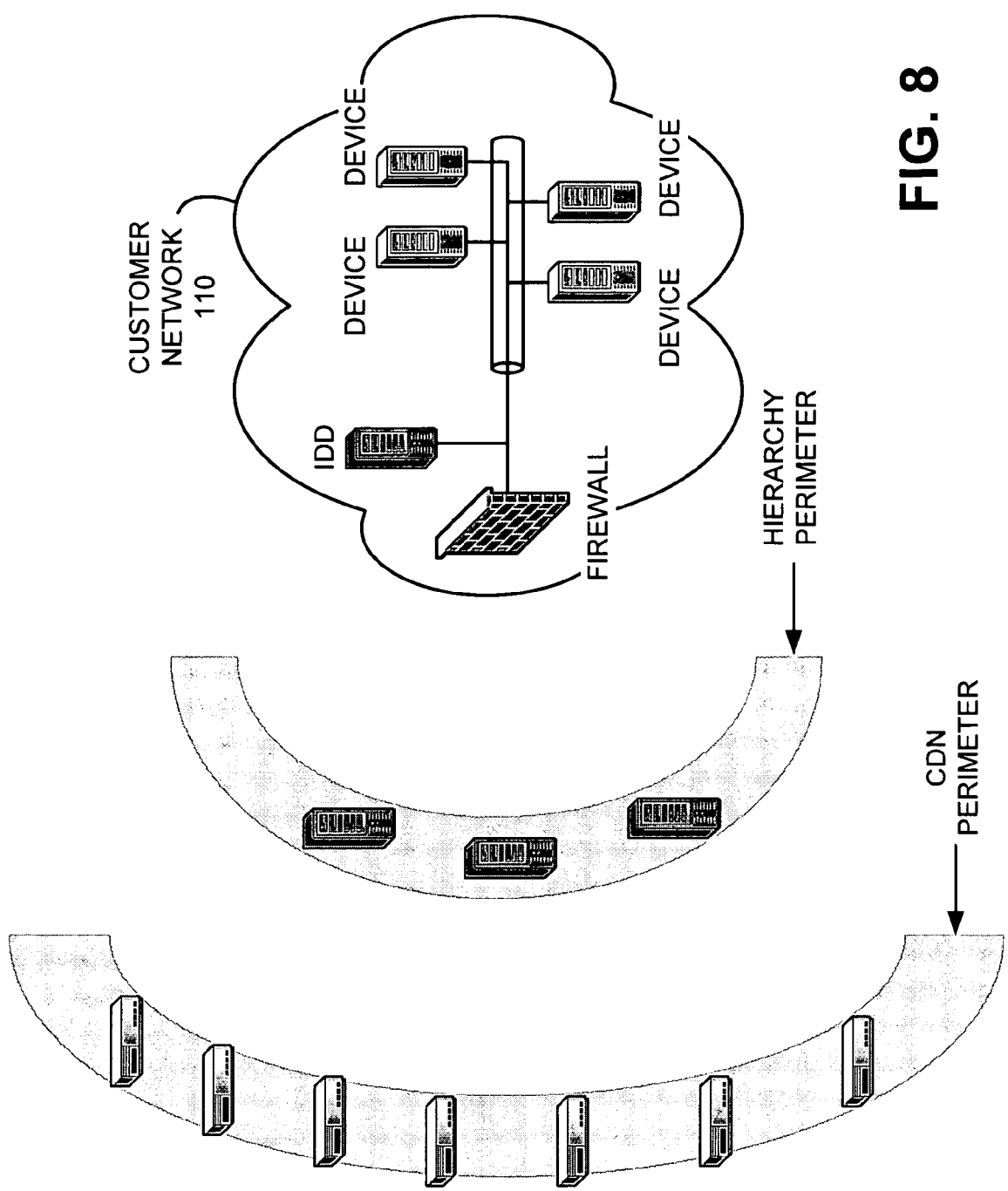
FIGS. 8-10 are diagrams of exemplary combinations of security perimeters that may be used in other implementations consistent with the principles of the invention.
Figure 9:
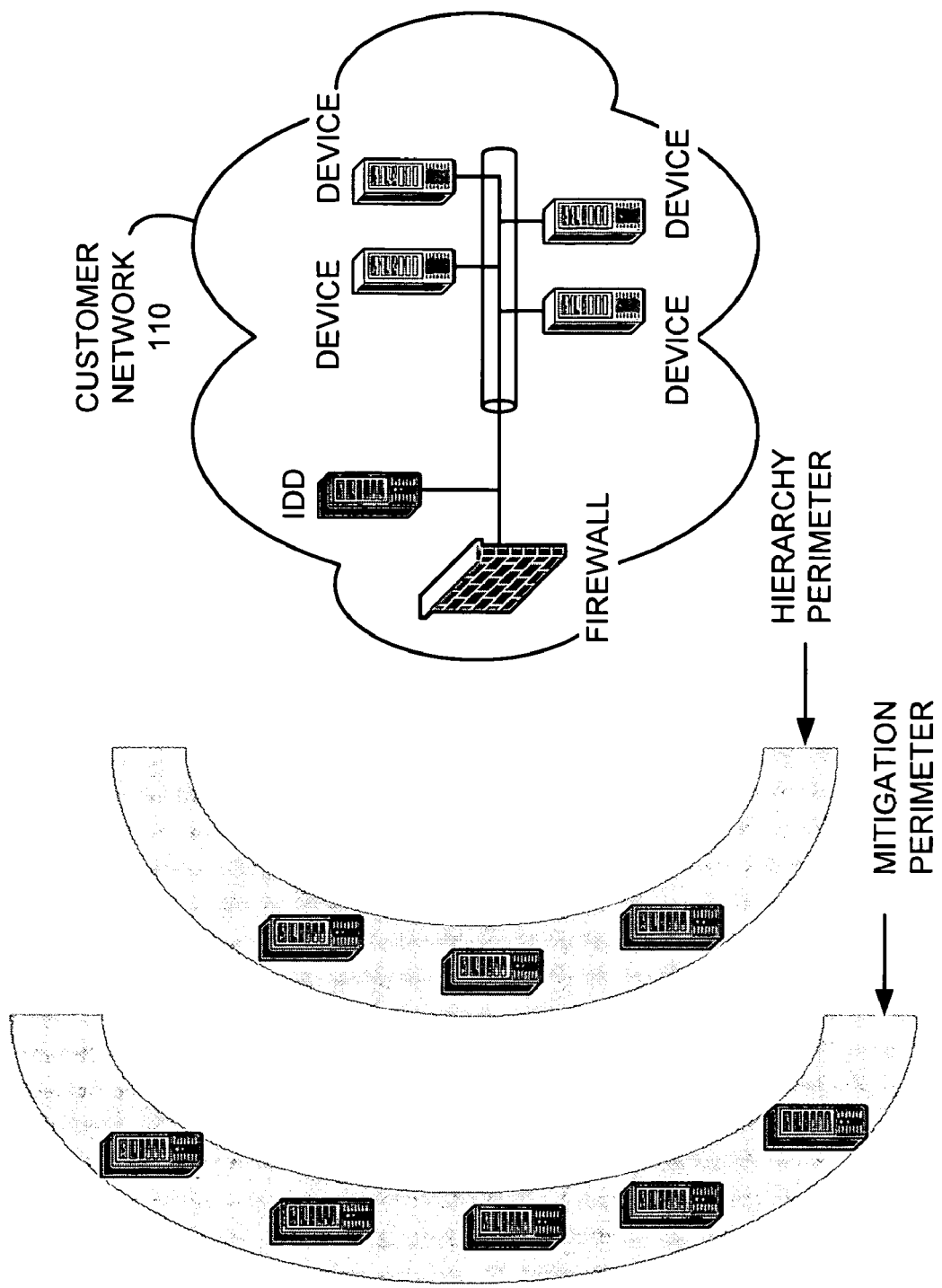
Figure 10:
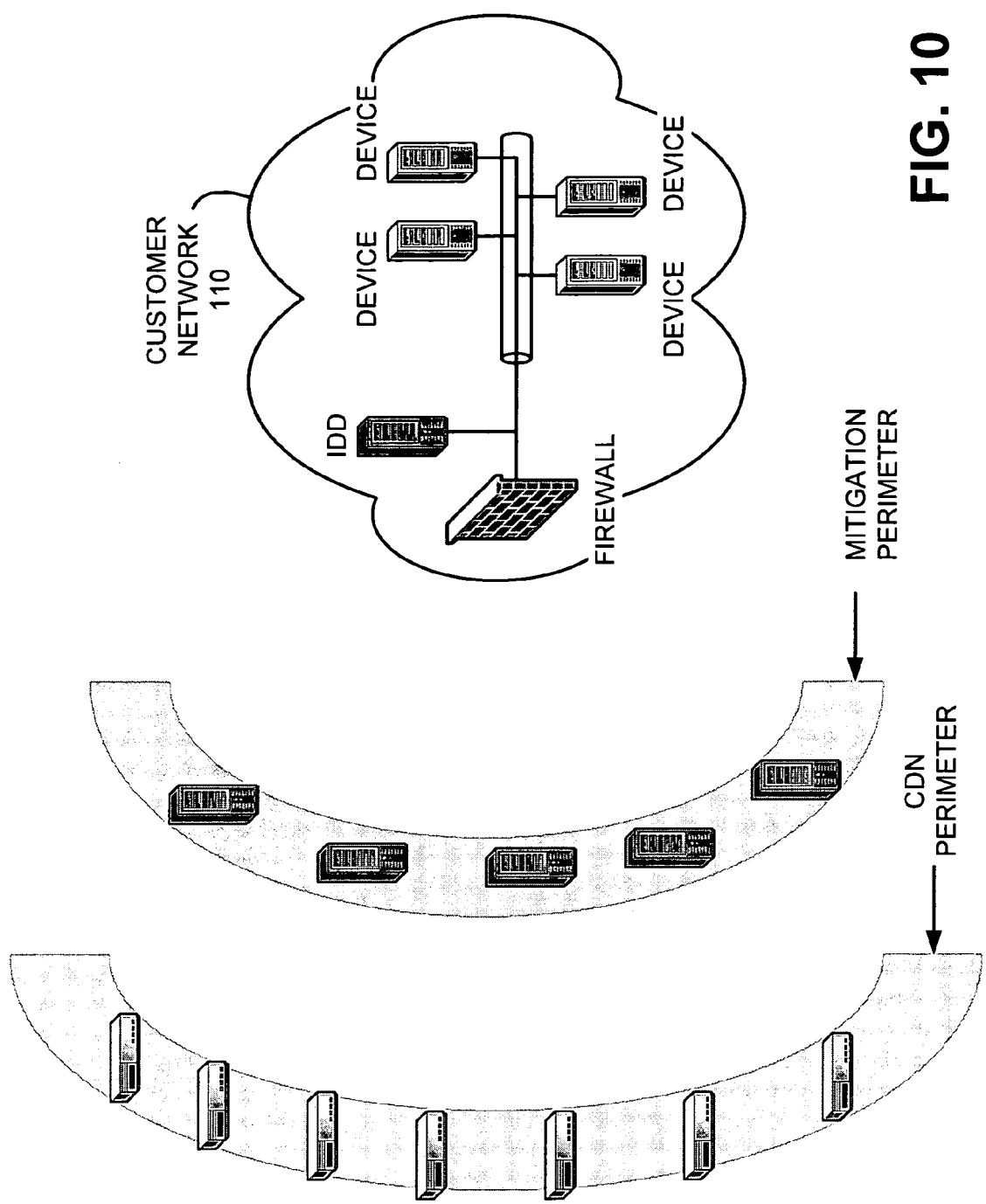

While three security perimeters have been described as inter-operating to provide security to customer network 110, other combinations of these security perimeters may be used in other implementations consistent with the principles of the invention. FIGS. 8-10 are diagrams of exemplary combinations of security perimeters that may be used in other implementations consistent with the principles of the invention. As shown in FIG. 8, the CDN and hierarchy perimeters may operate together to provide security to customer network 110. As shown in FIG. 9, the mitigation and hierarchy perimeters may operate together to provide security to customer network 110. As shown in FIG. 10, the CDN and mitigation perimeters may operate together to provide security to customer network 110. The inter-operation of these perimeters should be generally understood based on the description provided previously.

Exemplary Implementation

FIG. 11 is a flowchart of an exemplary implementation consistent with the principles of the invention. The processing of FIG. 11 may begin with reception of traffic associated with a customer network at a first device that may be located outside of the customer network (block 1110). In one implementation, the first device may include a CDN device. The first device may determine whether the traffic can be understood or processed.

When the traffic can be understood or processed, the first device may determine whether the traffic includes malicious traffic. The first device may use one or more well known network attack detection/prevention techniques to determine whether the traffic is legitimate or malicious. When the traffic is legitimate, the first device may process the traffic as described above. When the traffic is malicious, the first device may discard the traffic or take some other known security measure.

When the traffic cannot be understood or processed, the first device may send the traffic to a second device that may also be located outside of the customer network (block 1120). In one implementation, the second device may include a hierarchy device. The second device may determine whether the traffic includes malicious traffic (block 1130). The second device may use one or more well known network attack detection/prevention techniques to determine whether the traffic is legitimate or malicious. If the traffic is legitimate, then the second device may process the traffic, if necessary, and/or forward the traffic to the customer network.

When the traffic is malicious, a mitigation service may be initiated (block 1140). In this case, customer traffic may be redirected to a third device. In one implementation, the third device may include a mitigation device. The third device may process the traffic to remove malicious traffic and leave legitimate traffic. The third device may forward the legitimate traffic to the second device via, for example, a tunnel.

CONCLUSION

Systems and methods consistent with the principles of the invention may provide multiple security perimeters to secure a customer's network. These security perimeters may obscure the presence of the customer's network and permit the customer to perform system patches and upgrades in a more organized and less disruptive fashion.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6 and 11, the order of the acts may be modified in other implementations consistent with the principles of the invention. Further, non-dependent acts may be performed in parallel.

Also, it has been described that various devices transmit and receive network traffic. The term "traffic" is intended to refer to any type or form of data, including packet and non-packet data. The term "datagram" may also be used to refer to any type or form of data, such as packet and non-packet data.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A security system associated with a customer network, comprising:
   a first security perimeter including a plurality of content delivery network (CDN) devices to provide first protection against a network attack associated with the customer network, the plurality of CDN devices serving content on behalf of the customer network and acting as a first termination point for the customer network;
   a second security perimeter including a plurality of mitigation devices to provide second protection in terms of mitigation services as a result of a network attack associated with the customer network, the plurality of mitigation devices process traffic intended for the customer network to remove malicious traffic and forward legitimate traffic toward the customer network; and
   a third security perimeter including a plurality of hierarchy devices to provide third protection against a network attack associated with the customer network, the plurality of hierarchy devices functioning as reverse proxies for the customer network and acting as a second termination point for the customer network, the plurality of hierarchy devices receiving the legitimate traffic from the plurality of mitigation devices.

2. The security system of claim 1, where the first, second, and third security perimeters are located outside of the customer network.

3. The security system of claim 1, where each of the plurality of CDN devices is to serve replicated content associated with the customer network and provide security services with regard to requests for the replicated content.

4. The security system of claim 3, where each of the plurality of CDN devices is further to obscure the presence of the customer network.

5. The security system of claim 1, where one of the plurality of mitigation devices is to:
   receive traffic intended for the customer network,
   process the received traffic to remove the malicious traffic and leave the legitimate traffic, and
   forward the legitimate traffic toward the customer network.

6. The security system of claim 5, where a tunnel is established between the one of the plurality of mitigation devices and one of the plurality of hierarchy devices; and
   where, when forwarding the legitimate traffic toward the customer network, the one of the plurality of mitigation devices is to:
   apply a tunnel encapsulation to the legitimate traffic, and
   forward the legitimate traffic with the tunnel encapsulation to the one of the plurality of hierarchy devices via the tunnel.

7. The security system of claim 1, where each of the plurality of hierarchy devices is to act as a gateway for traffic intended for the customer network to obscure the presence of the customer network.

8. The security system of claim 1, where one of the plurality of hierarchy devices is to determine when the customer network is the subject of a network attack; and
   where one of the plurality of mitigation devices is to receive traffic redirected from the customer network when the customer network is the subject of the network attack.

9. The security system of claim 1, where the plurality of hierarchy devices are to receive traffic from the plurality of CDN devices and the plurality of mitigation devices.

10. The security system of claim 1, where the plurality of CDN devices and the plurality of hierarchy devices are to obscure the presence of the customer network to protect the customer network against network attacks during system patching or upgrading within the customer network.

11. The security system of claim 1, where the plurality of CDN devices and the plurality of hierarchy devices are to use network attack detection or prevention techniques to identify or process malicious traffic intended for the customer network.

12. A security system associated with a customer network, comprising:
    a first security perimeter including a plurality of content delivery network (CDN) devices geographically distributed in a public network, the CDN devices being configured to serve as a first termination point for a first set of traffic intended for the customer network; and
    a second security perimeter including a plurality of hierarchy devices located within the public network, the hierarchy devices being configured to serve as a second termination point for a second set of traffic intended for the customer network, where the second set of traffic includes traffic from the CDN devices and traffic different from the traffic from the CDN devices.

13. The security system of claim 12, where the CDN devices and the hierarchy devices are to obscure the presence of the customer network to protect the customer network against network attacks during system patching or upgrading within the customer network.

14. The security system of claim 12, where the CDN devices and the hierarchy devices are to use network attack detection or prevention techniques to identify or process malicious traffic intended for the customer network.

15. The security system of claim 12, where each of the CDN devices is to serve replicated content associated with the customer network and provide security services with regard to requests for the replicated content.

16. The security system of claim 12, where each of the hierarchy devices is to act as a reverse proxy for traffic intended for the customer network to obscure the presence of the customer network.

17. A security system associated with a customer network, comprising:
    a first security perimeter including a plurality of hierarchy devices located outside of the customer network, each of the plurality of hierarchy devices is to:
    act as a reverse proxy for the customer network, and
    determine when the customer network is the subject of a network attack; and a second security perimeter including a plurality of mitigation devices located outside of the customer network, one of the plurality of mitigation devices is to:
- receive traffic intended for the customer network when one of the plurality of hierarchy devices determines that the customer network is the subject of the network attack,
- process the received traffic to remove malicious traffic and leave legitimate traffic, and
- forward the legitimate traffic to one or more of the plurality of hierarchy devices.

18. The security system of claim 17, where a mitigation service is initiated when the one of the plurality of hierarchy devices determines that the customer network is the subject of the network attack, the mitigation service causing traffic intended for the customer network to be redirected to one or more of the plurality of mitigation devices.

19. The security system of claim 17, where a tunnel is established between one of the plurality of mitigation devices and one of the plurality of hierarchy devices; and
where, when forwarding the legitimate traffic to one or more of the plurality of hierarchy devices, the one of the plurality of mitigation devices is to:
- apply a tunnel encapsulation to the legitimate traffic, and
- forward the legitimate traffic with the tunnel encapsulation to the one of the plurality of hierarchy devices via the tunnel.

20. The security system of claim 19, where the one of the plurality of hierarchy devices is to:
- receive the legitimate traffic with the tunnel encapsulation from the one of the plurality of mitigation devices,
- remove the tunnel encapsulation, and
- forward the legitimate traffic to the customer network.

21. The security system of claim 17, where each of the plurality of hierarchy devices is to act as a gateway for traffic intended for the customer network to obscure the presence of the customer network.

22. A method for protecting a customer network, comprising:
- receiving traffic associated with the customer network at a first device outside the customer network, the first device serving content on behalf of the customer network and acting as a first termination point for the customer network;
- sending the traffic to a second device outside the customer network, where the second device acts as a second termination point for the customer network;
- determining, at the second device, whether the traffic includes malicious traffic; and
- initiating, by the second device, a mitigation service when the traffic is determined to include malicious traffic by sending the traffic to a third device that performs the mitigation service to remove the malicious traffic and leave legitimate traffic, where the third device sends the legitimate traffic to the second device.

23. The method of claim 22, further comprising:
- determining, at the first device, whether the traffic includes malicious traffic; and
- discarding the traffic when the traffic is determined to include malicious traffic.

24. The method of claim 23, where determining, at the first device, whether the traffic includes malicious traffic includes:
- determining whether the traffic includes malicious traffic based on application-level filtering.

25. The method of claim 22, where sending the traffic to a second device includes:
- determining, at the first device, whether the traffic can be processed, and
- forwarding the traffic to the second device when the traffic cannot be processed.

26. The method of claim 22, where determining, at the second device, whether the traffic includes malicious traffic includes:
- determining whether the traffic includes malicious traffic based on application-level filtering.

27. The method of claim 22, further comprising:
- processing, at the third device, the traffic to remove malicious traffic and leave legitimate traffic; and
- forwarding the legitimate traffic to the second device.

28. The method of claim 27, where forwarding the legitimate traffic includes:
- establishing a tunnel between the third device and the second device, and
- sending the legitimate traffic from the third device to the second device via the tunnel.

* * * * *